United States Patent [19]

Kemp et al.

[11] Patent Number: 5,622,663
[45] Date of Patent: Apr. 22, 1997

[54] METHOD FOR PREPARING A CONTINUOUS FOAM PROFILE CONTAINING A FILAMENTARY CORE

[75] Inventors: Daniel N. Kemp, Midland; Dennis M. Schnettler, Sanford; Ronald W. Wieck, Bay City, all of Mich.

[73] Assignee: Dow Corning Corporation, Midland, Mich.

[21] Appl. No.: 490,370

[22] Filed: Jun. 14, 1995

[51] Int. Cl.$^6$ ............................ B29C 44/20; B29C 44/24
[52] U.S. Cl. ................ 264/45.9; 264/46.9; 264/272.11
[58] Field of Search ........................... 264/45.9, 46.9, 264/45.1, 271.1, 279.1, 272.11; 156/244.12

[56] References Cited

U.S. PATENT DOCUMENTS

| | | | |
|---|---|---|---|
| 2,218,385 | 10/1940 | Schulze | 264/45.9 |
| 3,900,543 | 8/1975 | Davis | 264/45.9 |
| 3,903,233 | 9/1975 | Dougherty | 264/45.9 |
| 3,914,357 | 10/1975 | Cereijo et al. | 264/46.8 |
| 3,981,649 | 9/1976 | Shimano et al. | 264/45.9 |
| 4,099,897 | 7/1978 | Takano et al. | 264/45.9 |
| 4,107,354 | 8/1978 | Wilkenloh et al. | 264/45.9 |
| 4,309,160 | 1/1982 | Poutanen et al. | 264/45.9 |
| 4,333,898 | 6/1982 | Schmidtchen | 264/45.9 |
| 4,354,989 | 10/1982 | Beach | 264/45.9 |
| 4,468,435 | 8/1984 | Shimba et al. | 156/244.12 |
| 4,547,328 | 10/1985 | Yuto et al. | 264/45.9 |
| 5,156,715 | 10/1992 | Starnes, Jr. | 156/244.12 |
| 5,391,335 | 2/1995 | Sakamoto et al. | 264/46.9 |
| 5,468,314 | 11/1995 | McGregor et al. | 264/244.12 |

FOREIGN PATENT DOCUMENTS

| | | | |
|---|---|---|---|
| 579575 | 7/1959 | Canada | 264/45.9 |
| 281209 | 3/1988 | European Pat. Off. . | |
| 1504355 | 1/1968 | Germany . | |
| 50-47247 | 4/1975 | Japan . | |
| 52-19584 | 5/1977 | Japan | 264/45.9 |
| 57-84828 | 5/1982 | Japan . | |
| 57-84517 | 5/1982 | Japan . | |
| 63-230316 | 9/1988 | Japan . | |
| 1149839 | 6/1989 | Japan . | |
| 1149840 | 6/1989 | Japan . | |
| 1410979 | 10/1975 | United Kingdom . | |

Primary Examiner—Allan R. Kuhns
Attorney, Agent, or Firm—Robert L. McKellar

[57] ABSTRACT

This invention provides a continuous profile comprising a crosslinked foam matrix and a continuous filament embedded within the matrix. The profile is prepared by 1) extruding in an upward direction a composite consisting essentially of a foamable and crosslinkable composition containing a continuous filament, followed by 2) crosslinking and foaming the composition while the composition is in a substantially non-flowing state and supported by the filament.

6 Claims, 2 Drawing Sheets

METHOD FOR PREPARING A CONTINUOUS FOAM PROFILE CONTAINING A FILAMENTARY CORE

BACKGROUND OF THE INVENTION

1. Field of the Invention

This invention relates to the production of a foamed material as a continuous, unsupported profile. More particularly, this invention relates to the production of continuous low density foam profiles by extruding a liquid foamable composition around a continuous filament as a core.

2. Background Information

Methods for applying relatively thin coatings of liquid materials on to filamentary structures such as fibers and wires are well known, as are methods for coating filamentary structures with thermoplastic materials that are solid at 25° C.

It is known to extrude a small diameter stream of foamable organic or organosiloxane polymer compositions on to a substrate to form a gasket, however the composition cannot support its own weight until at least the surface of the extruded article is crosslinked.

The extrusion of a layer of foamed polyethylene with a thickness of up to 1 mm using molten polymer as the coating material is described in Japanese Laid Open Patent Application No. 50/47247.

Extrusion of a melt-extrudable resin, a foaming agent and a foaming aid is described in Japanese Patent No. 1,149,839 and 1,149,840. The process can be used to form a foam coating on a wire.

Extrusion of foam-coated wire by blending a resin with a solvent type foaming agent at a concentration of 0.1 to 10 parts by weight per 100 parts of resin and extruding the resultant mixture around a copper wire is described in Japanese Laid Open Patent Application No. 57/84,828. A similar process using polyethylene in combination with a chemical blowing agent is described in Japanese Laid Open Patent Application 57/84,517.

The addition of 30 to 120 weight percent, based on the weight of polymer, of a liquid foaming agent into a molten polymer within an extruder is described in British Patent Application 1,410,979. The action of the foaming agent is suppressed until the blend of polymer and foaming agent exits from the extruder.

Extrusion of a mixture of molten polypropylene, a foaming agent and a crosslinking agent onto a wire is described in German Patent Application 1,504,355 A.

A method for manufacturing a foamed part containing reinforcement core wires embedded therein is described in Japanese Laid Open Patent Application 63/230,316.

Extrusion of a 5–50 weight percent solution of a high molecular weight polyolefin through an annular gap around the object to be coated followed by stretching of the extrudate is described in European Laid Open Application No. 281,209 A. The solvent is substantially removed from the extrudate during stretching.

In the past it has not been feasible to continuously extrude at ambient temperature self-supporting profiles using crosslinkable, foamable compositions that are liquid at 25° C. and cure to yield foams with a density lower than about 30 lb/ft$^3$ (480 kg/m$^3$).

Foam prepared by extruding molten or solubilized non-curable polymer compositions containing a heat-activated blowing agent typically exhibit higher compression deflection values (greater force required for a given percent compression), higher densities and higher compression set values than foams prepared from curable compositions that are liquid under ambient conditions.

One objective of this invention is to provide a method for extruding foams using curable compositions that are flowable under ambient conditions. A second objective is to provide soft, compressible foams exhibiting a relatively uniform cell structure as continuous self-supporting profiles.

SUMMARY OF THE INVENTION

The objectives of this invention are achieved by providing a continuous profile comprising a low density crosslinked foam containing a continuous filament embedded therein. The profile is prepared by extruding a curable, foamable composition concurrently with a pre-formed filament that is not self supporting. The composition and the filament are co-extruded in an upward direction through an orifice and reservoir of specified dimensions, following which the extruded product is heated sufficiently to form a crosslinked foam.

DETAILED DESCRIPTION OF THE INVENTION

One embodiment of this invention provides a continuous profile of substantially circular cross-section, comprising a non-self-supporting filamentary core surrounded by a matrix of a cured organic or organosiloxane foam having a density of up to 30 lb/in$^3$ (480 kg/m$^3$) and a height of up to about 2 cm.

This invention also provides a method for preparing an extruded foam profile, said method comprising the steps of (1) forming a composite comprising a matrix of a curable liquid foamable composition completely surrounding a substantially linear, non-self-supporting filament having a cross-sectional area A1 by concurrently extruding said composition and said filament in an upward direction through a die orifice into a cylindrical reservoir having a bottom surface and a substantially vertical wall, wherein the velocities of said matrix and said filament are substantially equal, said die orifice is centered in said bottom surface and encloses an area A2, and the height of said vertical wall is sufficient to impart a substantially uniform cross-section to said composite;

(2) heating said composite as required to form a crosslinked foam profile; and (3) collecting said profile at a rate that maintains a substantially uniform tension on said filament.

Figure 1:
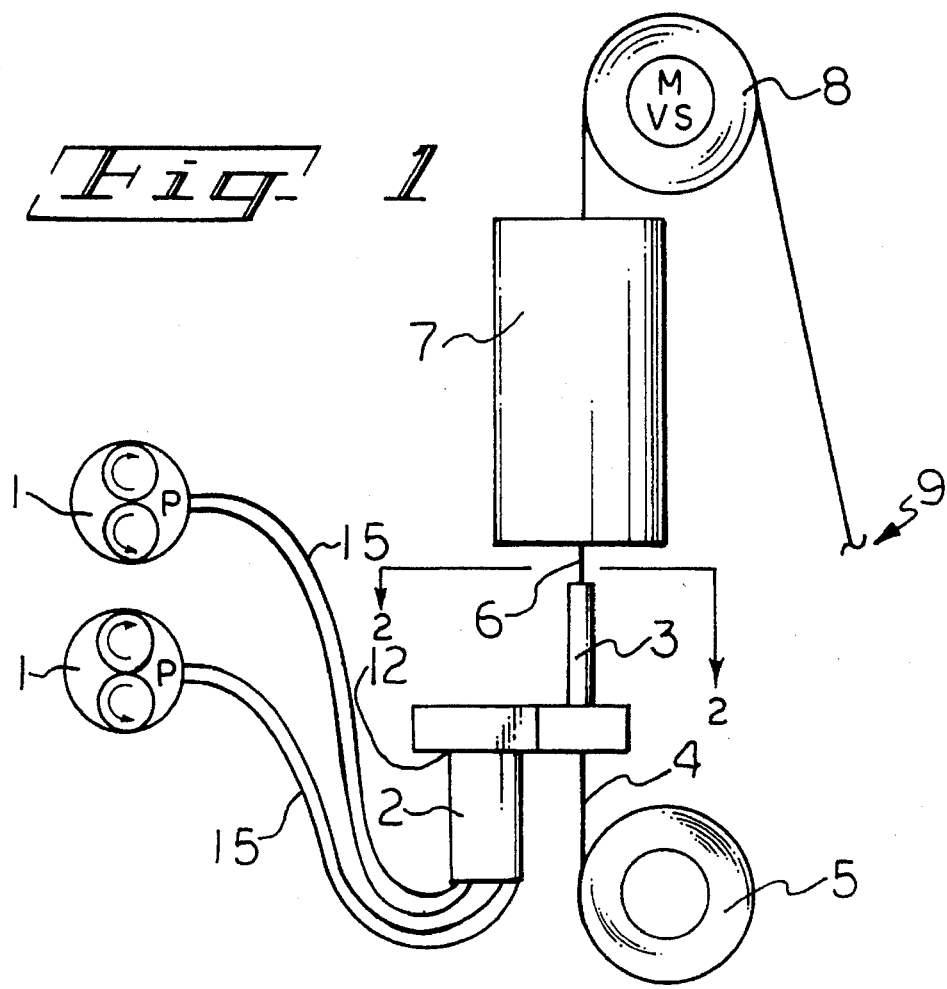
FIG. 1 is a schematic diagram of an apparatus for preparing crosslinked foam profiles in accordance with the present method.
Figure 2:
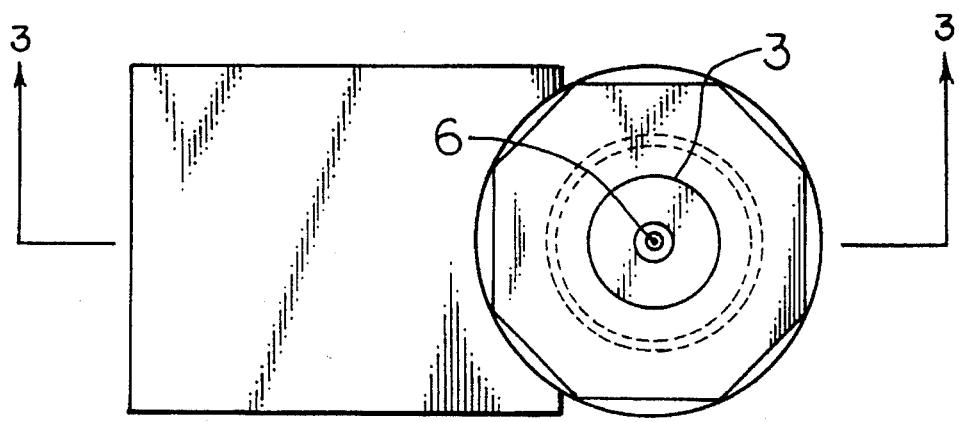
FIG. 2 is a full top view of a preferred extrusion head for preparing the present foam profiles.
Figure 3:
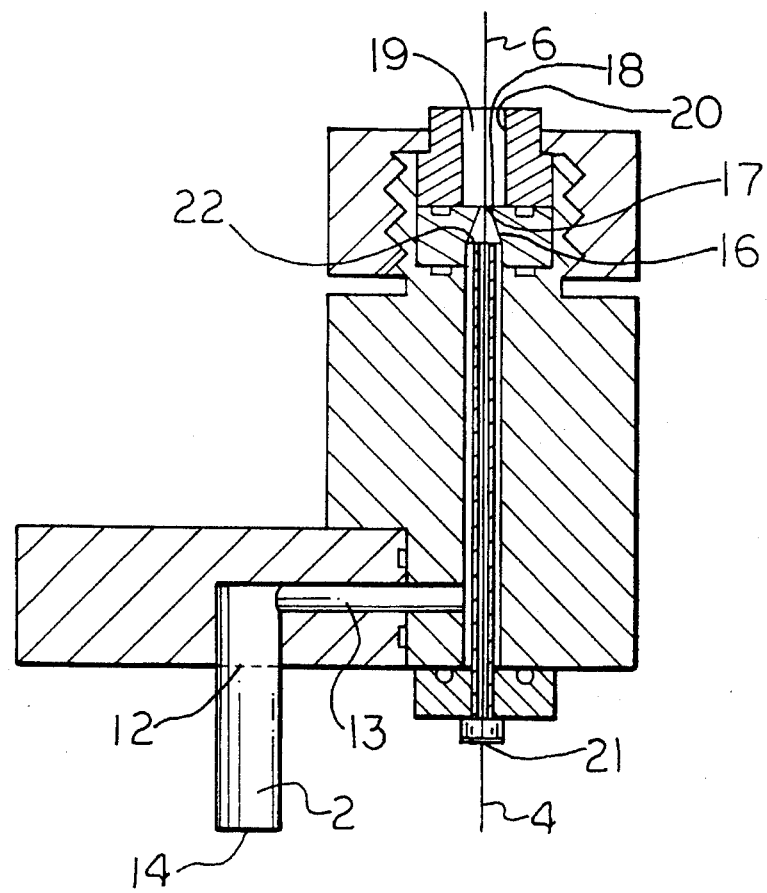
FIG. 3 is a cross-sectional view at plane 3—3 in FIG. 2 showing a filament passing through the cross head die.

To obtain a uniform cell structure using the preferred curable compositions and process conditions defined in subsequent portions of this specification, the area referred to as A2 exceeds the area referred to as A1 by less than 0.001 in$^2$ (0.0065 cm$^2$), A detailed description of the apparatus shown in FIGS. 1, 2 and 3 appears in the detailed description of the present method that forms part of this specification.

One of the inventive features of the present invention resides in Applicants' discovery that when a liquid curable and foamable composition and a filament are co-extruded upwards into a reservoir of specified dimensions rather than into free space, the liquid composition will retain its integrity and a uniform cross-section for a time sufficient to achieve foaming and crosslinking.

The second inventive feature of the present invention resides in the requirement that tension on the filament used as the core of the present foam profiles is not allowed to vary substantially during the extrusion process. Excessive variation of filament tension results in an unacceptable variation in the appearance, particularly contour and diameter, and the internal cell structure of the cured profile.

As used in this specification, the term filament includes any flexible material in the form of substantially continuous linear non self-supporting single or multiple threads, fibers or wires. The term "substantially continuous" implies that the length to diameter ratio of the filament is at least 100 to 1. Both solid and hollow filaments are suitable for use in accordance with the present method.

The diameter of the filament is not critical, and will be determined at least in part by the desired diameter of the final cured profile.

As used in this specification, the term "non self-supporting" means that the filament collapses under its own weight when an attempt is made to orient it vertically while grasping it from the lower end.

Examples of filaments suitable for use in the present method include but are not limited to single filaments of organic or inorganic materials and yarns obtained by twisting together two or more of these single filaments. The only requirements for the material used to form the filament is that it not be self supporting and that it be capable of maintaining its integrity and physical properties during co-extrusion with the foamable composition and at the temperature(s) used to foam and crosslink this composition.

Preferred filaments include multi-strand wires formed from copper, aluminum, or other metals and single- and multi-strand filaments, also referred to as yarns, formed from organic polymers and inorganic glasses. Multi-strand filaments wherein the individual fibers are braided or twisted are preferred relative to single strand filaments based on the improved retention of liquid foamable compositions on this type of filament. Braided multi-strand filaments are particularly preferred.

The crosslinkable polymer(s) and crosslinking agents present in the foamable compositions of this invention can be any that are liquid at 25° C. and will react to form a cross-linked structure relatively rapidly, typically within one minute or less, at temperatures above about 50° C.

Suitable organic polymers are liquid at 25° C. and contain reactive groups that will react with other groups to form a crosslinked structure. Examples of this type of polymer include but are not limited to condensation polymers such as polyesters, polycarbonates, polyamides, polyethers and polyurethanes; and addition polymers such as polyvinyl alcohol, esters of polyvinyl alcohol and polyvinyl acetals.

Examples of reactive groups that can be used to crosslink the polymer include but are not limited to carboxyl, hydroxyl, amino, isocyanate and epoxy. These groups can be present as liquid polymers containing at least two of these groups per molecule or as liquid polyfunctional monomeric compounds.

For example, a polyisocyanate can be reacted with a polyfunctional alcohol or a polymer containing at least two hydroxyl groups per molecule to yield a polyurethane. The composition would also contain sufficient water to react with excess isocyanate to form the carbon dioxide that functions as the blowing agent.

If a gaseous blowing agent is not formed as a by-product of the reaction used to crosslink the curable composition, a thermally activated blowing agent such as an azocarbodiimide should be included in the crosslinkable composition. Alternatively, a pressurized gas such as nitrogen can be injected into the composition while it is confined in the extrusion head.

Preferred foamable organosiloxane compositions contain at least one polyorganosiloxane as the crosslinkable polymer. The polyorganosiloxanes contain alkenyl radicals or silanol groups as the reactive groups and are crosslinked by the polymer with organosilicon compounds containing silicon-bonded hydrogen atoms. The hydrogen gas produced as a product of the reaction of silicon-bonded hydrogen atoms with silanol and/or hydroxyl groups present in the composition serves as a blowing agent for the foam.

The ingredients of preferred organosiloxane compositions useful for preparing extruded foam profiles in accordance with the present method will now be described in detail.

The Crosslinkable Polyorganosiloxane (Ingredient A)

One type of crosslinking reaction involves silicon-bonded hydrogen atoms present on a crosslinking agent and silanol groups present on the curable polyorganosiloxane. The hydrogen required as a blowing agent is generated as a by-product of this reaction.

The second type of crosslinking reaction is a hydrosilation reaction between alkenyl radicals present on the curable polyorganosiloxane and silicon-bonded hydrogen atoms present on the curing agent.

Depending upon the properties desired in the cured foam the curable composition contains at least one silanol-functional polyorganosiloxane, alkenyl-functional polyorganosiloxane or a mixture of both types of polyorganosiloxanes.

It will be understood that if the polyorganosiloxane does not contain a sufficient concentration of silanol groups to generate the hydrogen required to achieve the desired cell structure and properties, additional compounds containing hydroxyl or silanol groups, referred to in this specification as ingredient C, must be present in the curable composition. The silanol groups can be present on silanes or low molecular weight organosiloxanes, and the hydroxyl groups are typically present as water or a mono- or polyhydric alcohol.

Suitable alcohols contain from 1 to 12 carbon atoms, and include but are not limited to methanol, ethanol, propanol, benzyl alcohol, lauryl alcohol, ethylene glycol, propylene glycol, and 1,4-butanediol. The use of alcohols to modify the physical properties of foams prepared using curable organosiloxane compositions is described in U.S. Pat. No. 4,590,222, which issued on May 20, 1986, the relevant disclosures of which are incorporated by reference.

Polyorganosiloxanes suitable for use in the thixotropic compositions of the present invention contain at least two alkenyl radicals or silanol groups per molecule and exhibit a viscosity of from 0.1 to 100 Pa.s at 25° C. At least 90 percent of the repeating units in this polyorganosiloxane are diorganosiloxane units represented by the general formula $R^1R^2SiO$ where $R^1$ and $R^2$ are individually selected from monovalent unsubstituted and substituted monovalent hydrocarbon radicals that typically contain from 1 to 10 carbon atoms. The alkenyl radicals and silanol groups that characterize the curable polyorganosiloxane are preferably located at the terminal positions of the molecule, however one or more can be bonded to non-terminal siloxane units as well.

In preferred curable polyorganosiloxanes at least one of the hydrocarbon radicals bonded to each silicon atom is preferably methyl and any remaining ones are phenyl, 3,3,3-trifluoropropyl, alkenyl or silanol groups.

The Crosslinking Agent (Ingredient B)

Preferred organosiloxane compositions suitable for use in accordance with the present method contain at least one organohydrogensiloxane that supplies the silicon-bonded hydrogen atoms required to crosslink the composition and generate the hydrogen gas that creates the cellular structure of the foam. The organohydrogensiloxane can have a linear or branched structure, and can be homopolymers, copolymers or mixtures of these two types of polymers.

It has been found that a desirable combination of cured foam properties can be obtained if the curable composition contains a combination of both linear and branched types of organohydrogensiloxanes. The organohydrogensiloxane contains at least 3 silicon-bonded hydrogen atoms and no silicon atom is bonded to more than 1 hydrogen atom. The remaining valences of the silicon atoms present in this ingredient are satisfied by oxygen and the same types of monovalent hydrocarbon radicals present on the curable polyorganosiloxane, with the exception of alkenyl radicals.

A preferred linear type of organohydrogensiloxane exhibits a viscosity of from 0.01 to 10 Pa.s at 25° C. and comprises dialkylsiloxane and alkylhydrogensiloxane units with trialkylsiloxy terminal units. The alkyl radicals contain from 1 to 4 carbon atoms, and are most preferably methyl.

A preferred type of organohydrogensiloxane composition containing branched siloxane molecules comprises trimethylsiloxy, methylhydrogensiloxane and $SiO_{4/2}$ units, and is described in U.S. Pat. No. 4,322,518, which issued on Mar. 30, 1982. The portions of this patent relating to the copolymers and a method for preparing them are incorporated into this specification by reference. These copolymers are prepared by blending resinous organosiloxane copolymers comprising trimethylsiloxy and $SiO_{4/2}$ units with at least one substantially linear methylhydrogensiloxane.

The relative concentrations of crosslinkable polyorganosiloxane (ingredient A) and organohydrogensiloxane (Ingredient B) in the present compositions is equivalent to a molar ratio of silicon-bonded hydrogen atoms to the combination of alkenyl radicals, silanol groups and carbinol groups that is typically from 3.5:1 to 5.5:1, and preferably about 5:1.

The weight ratio of linear to non-linear organohydrogensiloxanes is preferably about 2:1.

The Crosslinking and Foaming Catalyst (Ingredient D)

Depending upon the reactions used to crosslink the foam profile and generate the gas that functions as the blowing agent, the curable composition may contain a catalyst for one or both of these reactions. If the crosslinking reaction is between silicon-bonded hydrogen atoms and either alkenyl radicals or silanol groups, the catalyst is preferably a metal from the platinum group of the periodic table or a compound of one of these metals.

Particularly preferred catalysts include platinic chloride, chloroplatinic acid and coordination complexes of these compounds with ethylenically unsaturated organosiloxanes such as divinyltetramethyldisiloxane. These coordination complexes can be prepared as described in U.S. Pat. No. 3,419,593, which issued on Dec. 31, 1968, which is incorporated herein by reference.

The concentration of catalyst is typically equivalent to from 3200 to 6000 parts of platinum group metal per one million parts by weight of curable composition.

Optional Ingredients

To reduce cell size and increase uniformity of the cell structure in the crosslinked foam, the curable compositions preferably include a thixotropic agent. This ingredient appears to reduce the rate at which the liquid composition flows on the filament that is co-extruded with the composition until the composition has become sufficiently crosslinked to form a non-flowable material.

A number of solid and liquid materials have been shown to impart thixotropic properties to compositions containing organic and organosiloxane polymers. These materials include fumed silica, polydiorganosiloxanes containing a series of two or more oxyalkylene (—RO—) units bonded through an alkylene radical to at least one silicon atom, and hydrogenated glycerides derived from at least one ethylenically unsaturated carboxylic acid containing from 12 to 20 carbon atoms.

The hydrogenated glycerides can contain at least one hydroxyl group as an optional substituent. These acids are also referred to as unsaturated fatty acids, and include but are not limited to dodecanoic, oleic, linoleic and ricinoleic (12-hydroxy-9-octadecenoic) acids. Hydrogenated castor oil, a mixture of the glycerides of ricinoleic , oleic and linoleic acids, is a preferred thixotropic agent based on its cost and availability.

Hydrogenated fatty acid glycerides are preferred relative to other known thixotropic agents for use in the present compositions based on their ability to prevent substantial flowing of an otherwise flowable curable compositions containing organic or organosiloxane polymers prior to curing when the composition is applied to an inclined or vertical surface.

Unlike other known thixotropic additives for organosiloxane compositions, such as finely divided forms of silica, the present thixotropic agents do not adversely affect the processability of the curable composition or the desired properties of the cured foam, particularly its texture and density.

The thixotropic agent constitutes from 0.5 to 5 weight percent, preferably from 1 to about 4 weight percent, of the present compositions. Concentrations greater than about 5 weight percent make the compositions difficult to process in conventional mixing equipment.

In addition to the thixotropic agent, the present compositions can contain various ingredients to modify the properties of the curable composition and/or the cured foam.

These additional optional ingredients include but are not limited to finely divided reinforcing and non-reinforcing mineral fillers such as quartz and calcium carbonate; metal oxides such as alumina, hydrated alumina, ferric oxide and titanium dioxide; pigments such as carbon black and zinc oxide; organic pigments and dyes, anti-oxidants, foam stabilizers, heat stabilizers, ultraviolet stabilizers, flame retarding agents and catalyst inhibitors such as cyclic methylvinylsiloxanes to increase the working time of the curable composition.

A preferred optional ingredient in organosiloxane compositions is a resinous organosiloxane copolymer containing triorganosiloxy and $SiO_{4/2}$ units. The triorganosiloxy units in this type of copolymer can be represented by the formula $R^3_3SiO_{1/2}$ where $R^3$ represents a monovalent unsubstituted or substituted hydrocarbon radical. In preferred copolymers the hydrocarbon radicals represented by $R^3$ are a combination of lower alkyl, most preferably methyl. The molar ratio of triorganosiloxy units to $SiO_{4/2}$ units in the copolymer is typically from 0.7 to 1.2, inclusive. The copolymer constitutes up to 30 percent of the combined weight of the curable alkenyl-substituted polyorganosiloxane and the copolymer, and at least a portion of the silicon atoms in the copolymer contain ethylenically unsaturated hydrocarbon radicals such as vinyl as substituents.

Preparation of Curable Compositions

The present compositions begin to cure and foam at temperatures as low as 25° C. or lower when all of the reactants and the curing catalyst are combined.

If it is desired to store the compositions prior to extruding them in accordance with the present method this can be achieved by packaging the ingredients in two or more containers. For the preferred organosiloxane compositions, the organohydrogensiloxane and crosslinking catalyst are located in separate containers.

The Formation of Continuous Foam Profiles

In accordance with the present method for preparing continuous foam profiles, a composite consisting essentially of a filamentary core surrounded by a matrix of a curable foamable composition is extruded in a upwards in a substantially vertical direction through an extrusion die located in the bottom of a cylindrical reservoir. After passing through the reservoir the composition comprising the matrix of the composite is foamed and crosslinked. Using the preferred foamable organosiloxane compositions, heating accelerates both the curing and foaming reactions. Given sufficient time, both of these reactions will go to completetion in the absence of heating.

To obtain the present foam profiles in a commercially useful processing time using conventional foamable and curable organosiloxane compositions in the absence of curing accelerators it is usually desirable to accelerate the foaming and curing reactions by heating the extruded composite at a temperature of at least 50° C.

Preferred dies for use in forming the present composites are referred to in the literature as "cross head dies" and are typically used for coating wires with liquid or molten materials. The contour of the die orifice is preferably similar to the contour of the filament that is coated with the curable, foamable composition.

Using the preferred curable organosiloxane compositions of the present invention, the cross sectional area of the orifice (A2) exceeds the cross sectional area of the continuous filament (A1) by no more than 0.001 inch$^2$ (0.065 mm$^2$).

During operation of the present method this space within the die orifice is occupied by the curable composition.

The present inventors have discovered that when the area between the perimeter of the filament and the wall of the extrusion orifice exceeds about 0.001 inch$^2$ (0.065 mm$^2$), the average cell size within the cured foam increases and the uniformity of the cell structure deteriorates using the preferred range of operating conditions, particularly extrusion rate, orifice diameters and curaable compositions for the foam portion of the present profiles.

The equipment used to transport the filament and the curable composition to the extrusion orifice is not critical, and is preferably similar to the equipment used for co-extruding a wire and a two-part curable coating composition.

Referring to FIG. 1 of the accompanying drawings, the ingredients of a two-part heat curable and foamable composition are transported by suitable means such as gear pumps (1) through a static mixer (2) into a cross head type of extrusion head (3) wherein it coats a filament (4) that is transported through the extrusion head (3) from a suitable supply (5). The coated filament (6) exits from the extrusion head (3) in an upward direction and enters an oven (7) wherein the coating on the filament undergoes foaming and crosslinking. After exiting from the oven the foam profile passes over a guide reel (8) and descends to a suitable collection area (9).

Figure 4:
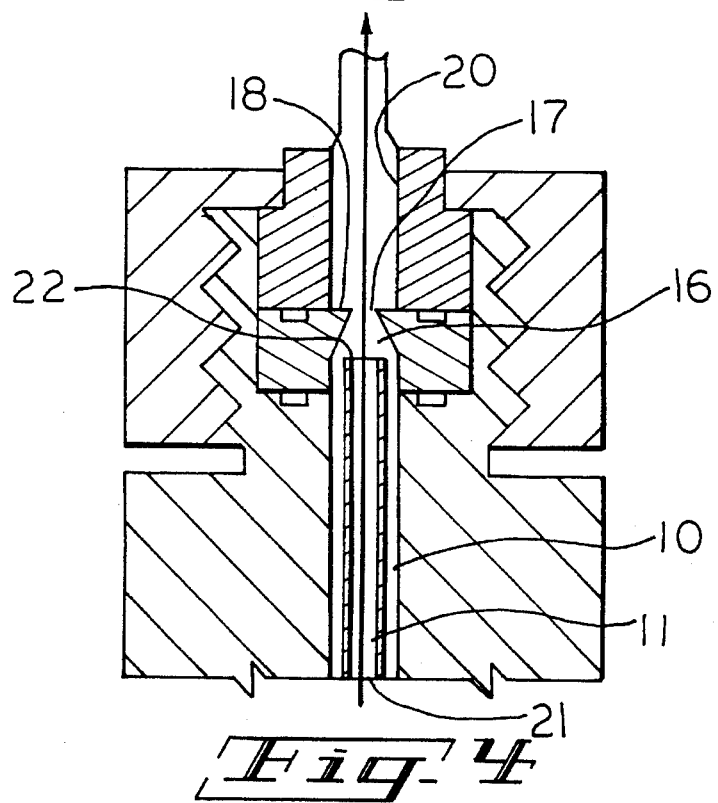
FIG. 4 is an enlarged cross-sectional view at plane 3—3 of FIG. 2 showing both a filament and a foamable and curable liquid organosiloxane composition passing through the cross head die.

Referring to FIGS. 3 and 4 of the accompanying drawings, which are cross-sectional views of a preferred extrusion assembly, the extrusion head (3) is a cross head die containing an outer conduit (10) and an inner conduit (11) that is concentric with respect to the outer conduit (10). Both conduits are cylindrical. In preferred embodiments of the present apparatus the diameter of the outer conduit (10) is from 0.1 to 0.3 inch (25 to 76 mm) and the diameter of the inner conduit (11) is from 0.04 to 0.07 inch (1 to 1.8 mm).

The outer conduit (10) is connected to the outlet (12) of a static mixer (2) for the crosslinkable organosiloxane composition by means of a first supply conduit (13). The inlet (14) of the static mixer (2) is connected to two second supply conduits (15) for the two-part curable organosiloxane composition. As shown in FIG. 3 and 4, a filament (4) occupies the central portion of the inner conduit (11) and the curable, foamable composition occupies the outer conduit (10).

The outer conduit (10) terminates in a conical section (16) leading to an orifice (17) measuring from 0.025 to 0.06 inch (0.64 to 1.5 mm) in diameter located in the center of the base (18) of a reservoir (19). When the present method is used to prepare foam profiles from the preferred organosiloxane compositions described in the accompanying examples, the diameter of the base (18) is from 0.2 to 0.4 inch (5 to 10 mm) and is surrounded by a cylindrical wall (20) measuring from 0.2 to 0.4 inch (5 to 10 mm) in height.

In preferred embodiments the wall (20) is perpendicular with respect to the base (18) of the reservoir (19). The diameter of the base (18) of the reservoir yielding the optimum foam structure in the cured profile may vary with the flow rate and the viscosity of the curable, foamable composition through the orifice (17).

The height of the wall of the reservoir is sufficient to form a homogeneous foam profile exhibiting a uniformly small cell structure. For preferred curable compositions a height of 0.2 inch (5 mm) is sufficient.

For purposes of the present invention, the area between the surface of the filament (4) and the perimeter of the orifice (17) can be represented by the expression A2–A1, where A2 represents the diameter of the orifice (17) and A1 represents the diameter of the filament (4). To obtain uniform, linear cured profiles with uniformly small cells using the foamable organosiloxane compositions preferred for use in accordance with the present method, the value of A2–A1 should not exceed 0.001 in$^2$ (0.0065 cm$^2$).

The present inventors discovered that it is not possible to obtain a product of uniform diameter and appearance in the absence of the reservoir (19). The appearance of the surface of crosslinked profiles prepared using preferred compositions of this invention is adversely affected when the height of the wall exceeds about 0.5 inch (12.5 mm).

A filament (4) stored on a supply reel (5) enters the extrusion head (3) through an entry port (21) and passes through the inner conduit (11). At the junction (22) of the inner and outer conduits the foamable composition flowing through the outer conduit (10) coats the filament passing through the inner conduit (11) and the coated filament emerges from orifice (17) into the reservoir (19).

The product emerging from the extrusion die (17) is the filament (6) coated with a layer of the crosslinkable, foamable composition. When the initial viscosity at 25° C. of the curable organosiloxane or other foamable and curable composition is at least about 1000 centipooise (1 Pa.s) the forces associated with simultaneously moving of the composition and the filament through the die orifice (17) and the reservoir (19) are usually sufficient for the composition to be entrained as a uniform coating on the filament. The initial thickness of the coating is preferably 0.1 inch (2.5 mm).

The initially thickness and uniformity of the coating is maintained until the composition is sufficiently foamed and crosslinked to become non-flowable. This degree of crosslinking is achieved relatively rapidly, even at 25° C.

The extruded coated filament is heated sufficiently to crosslink the composition in the desired processing time. A preferred method for accomplishing this is passing the coated filament through an oven (7) maintained at a temperature of from 50° to 100° C. The temperature can be constant throughout the oven or the oven can contain two or more zones maintained at different temperatures. In a multizone oven the composition is typically exposed to higher temperatures as it travels through the oven.

The location and temperature(s) of the oven are selected to achieve at least partial crosslinking and foaming of at least the outer portion of the composition to achieve a dry, non-sticky surface before the profile reaches the collection area (9).

The length of the oven will be a function of the speed at which the coated filament travels through the oven and the temperature of the oven.

For preferred compositions of the present invention the residence time is about one minute at a temperature of 60° C.

Preferred crosslinked foam profiles prepared using the present method exhibit diameters from about 6 to about 20 cm. The cell size of the foam is from 0.1 to about 1 mm. Cell size is dependent upon a number of variables, including but not limited to the temperature(s) used to crosslink the composition, the homogeneity of the crosslinkable composition, When the crosslinkable composition contains at least one organosiloxane and at least one organohydrogensiloxane as the crosslinking agent, the diameter and cell structure of the foam profile can usually be altered by changing the type and concentration of organohydrogensiloxane in the composition and/or the curing rate of the organosiloxane composition.

Other parameters that appear to affect the size and uniformity of the cells in the crosslinked foam are the diameter and configuration of the orifice (17), the distance between the orifice and filament (4), which should be as small as possible to minimize cell size without requiring excessively high extrusion pressures, the use of foam stabilizing agents, the viscosity of the foamable composition and the density of the crosslinked foam. The average cell size appears to be inversely proportional to both viscosity and density.

Continuous foam profiles prepared using the present method find utility in a variety of end use applications, including but not limited to gaskets, liquid and vapor seals, compression seals in construction applications, including but not limited to buildings and roadways, as pre-shaped filling material in aircraft, automotive and mass transit vehicles to reduce noise and/or vibration and as weatherstripping in construction.

EXAMPLE

The following example describes a preferred embodiment of the present method and should not be interpreted as limiting the scope of the present invention as described in the accompanying claims. Unless otherwise specified all parts and percentages in the example are by weight and viscosities are the values measured at 25° C.

A crosslinkable, thixotropic organosiloxane composition was prepared by blending the following ingredients to homogeneity:

107 parts of a liquid dimethylvinylsiloxy-terminated polydimethylsiloxane exhibiting a viscosity of 55 Pa.s at 25° C.

24 parts of a benzene soluble resinous copolymer containing triorganosiloxy units and SiO$_2$ units in the molar ratio of 0.7 mol of triorganosiloxy units per mol of SiO$_2$ units, where the triorganosiloxy units are trimethylsiloxy and dimethylvinylsiloxy, and the copolymer contains about 1.8 weight percent of vinyl radicals.

15 parts of alumina trihydrate, 7 parts of benzyl alcohol, 1 part of a reaction product of hexachloroplatinic acid and sym-tetramethyldivinyldisiloxane that has been diluted with a liquid dimethylvinylsiloxy terminated polydimethylsiloxane in an amount sufficient to achieve a platinum content of 0.7 weight percent, 0.6 part of carbon black, and as the thixotropic agent, 3 parts of a hydrogenated castor oil available as Thixin R(R) from Rheox, Inc.

26 part of quartz with an average particle size of 5 microns;

12 parts of a mixture containing equal parts by weight of (1) a trimethylsiloxy-terminated organohydrogensiloxane containing 1.6 percent silicon bonded hydrogen and (2) an organosiloxane copolymer consisting essentially of $(CH_3)_3SiO_{1/2}$ and $SiO_2$ units with a molar ratio of $CH_3)_3SiO_{1/2}$: $SiO_2$ units of about 0.75. The resin can be prepared as described in U.S. Pat. No. 2,676,182 to Daudt et al. and contains from about 1.7 weight percent of hydroxyl groups.

5 parts of a trimethylsiloxy-terminated polydiorganosiloxane containing an average of five methylhydrogensiloxane units and three dimethylsiloxane units per molecule with a silicon-bonded hydrogen atom content of 0.8 weight percent.

Referring to the accompanying drawings, the ingredients of the curable composition were transported through a static mixer (2) that discharged into an extrusion head (3) that was oriented to extrude upward at an angle of 90° with respect to a horizontal plane.

The base (18) of reservoir (19) measured 0.25 inch (6.4 mm) in diameter and the wall (20) measured 0.285 inches (7.2 mm) in height.

Referring to FIG. 1 of the accompanying drawings, the inlet of a vertically oriented 8 ft. (2.4 meter)-long two-zone in-line oven (7) was located 1.5 ft. (0.46 meter) above the top of the extrusion head (3).

Prior to extrusion of the composition, the end of a 0.027 inch (0.7 mm-diameter) braided nylon filament stored on a reel (5) was passed through the inner conduit (11) of the extrusion head, through the oven (7) and over a 18 inch (45.7 cm)-diameter pulley (8) with a V-shaped groove located about 1 foot (30.5 cm) above the outlet of the oven, and descended to a collection area.

After the temperature in each zone of the oven had been adjusted to 66° C. the pumps supplying a two-part foamable and crosslinkable organosiloxane composition were activated. The ingredients were blended in the static mixer, passed into the extrusion head (3) and were extruded through the orifice (17) as a continuous stream at a rate of about 36 cc per minute using a pressure of 500 psig (3 MPa).

As the composition emerged into the reservoir (19) a portion became entrained on the filament as a continuous matrix. The resultant composite of filament and curable composition moved at a substantially constant rate of 8 feet (2.4 meters) per minute. The rate of travel of the composite was regulated by adjusting the feed rate of the filament.

During its passage through the oven the liquid composition was converted to a crosslinked foam profile with an average diameter of 0.4 inch (1 cm) and a cell size in the range from 0.2 to 1 mm. After emerging from the oven the foam profile passed over a pulley (8) and collected on a surface.

When the process described in the preceding section of this example was repeated using the same conditions with a liquid foamable organosiloxane composition containing the same ingredients but without the thixotropic additive (the hydrogenated castor oil), the cell size of the resultant cured profile ranged from 0.5 to 1.5 mm.

That which is claimed is:

1. A method for preparing an extruded foam article comprising the steps of (1) forming a composite comprising a matrix of a curable liquid foamable composition completely surrounding a substantially linear, non-self-supporting filament having a cross-sectional area A1 by concurrently extruding said composition and said filament in an upward direction through a die orifice into a cylindrical reservoir having a bottom surface and a substantially vertical wall, wherein the velocities of said matrix and said filament are substantially equal, said die orifice is centered in said bottom surface and encloses an area A2, and the height of said vertical wall is sufficient to impart a substantially uniform cross-section to said composite;

(2) heating said composite as required to form a crosslinked foam profile; and (3) collecting said profile at a rate that maintains a substantially uniform tension on said filament.

2. A method according to claim 1 wherein said curable liquid foamable composition comprises a) a liquid crosslinkable polymer selected from the group consisting of polyesters, polycarbonates, polyamides, polyurethanes, polyethers, polyvinyl alcohol, esters of polyvinyl alcohol, and polyvinyl acetals; and b) a crosslinking agent for said polymer.

3. A method according to claim 1 wherein A2 exceeds A1 by no more than 0.001 square inch (0.0065 cm$^2$) and said curable liquid foamable composition comprises a) a liquid polyorganosiloxane containing at least two alkenyl radicals or silanol groups per molecule and b) an organohydrogensiloxane containing at least three silicon-bonded hydrogen atoms per molecule in an amount sufficient to crosslink and foam said composition, and c) as the crosslinking and foaming catalyst, a metal from the platinum group of the periodic table or a compound of said metal.

4. A method according to claim 3 wherein at least 90 percent of the repeating units in said polyorganosiloxane are diorganosiloxane units represented by the general formula $R^1R^2SiO$ where $R^1$ and $R^2$ are individually selected from monovalent unsubstituted and substituted monovalent hydrocarbon radicals containing from 1 to 10 carbon atoms.

5. A method according to claim 4 wherein crosslinking foaming are carried out simultaneously by heating said extruded composition.

6. A method according to claim 4 wherein said composite is heated to a temperature of from 50° to 100° C.

* * * * *